United States Patent [19]
Eki et al.

[11] Patent Number: 5,706,046
[45] Date of Patent: Jan. 6, 1998

[54] IMAGE FORMING APPARATUS

[75] Inventors: Koji Eki, Yamatokoriyama; Akihiro Nishi, Nara, both of Japan

[73] Assignee: Sharp Kabushiki Kaisha, Osaka, Japan

[21] Appl. No.: 408,548

[22] Filed: Mar. 21, 1995

[30] Foreign Application Priority Data

Apr. 12, 1994 [JP] Japan .................. 6-073330

[51] Int. Cl.⁶ .................................................. B41J 2/47
[52] U.S. Cl. ........................................ 347/252; 347/131
[58] Field of Search .............................. 347/251, 254, 347/252, 240, 131; 358/298

[56] References Cited

U.S. PATENT DOCUMENTS

| | | |
|---|---|---|
| 5,005,139 | 4/1991 | Tung . |
| 5,029,108 | 7/1991 | Lung . |
| 5,252,995 | 10/1993 | Trask et al. . |
| 5,325,474 | 6/1994 | Kumazaki et al. . |
| 5,357,583 | 10/1994 | Sato et al. ............................ 382/22 |

FOREIGN PATENT DOCUMENTS

| | | |
|---|---|---|
| 0 537 789 A2 | 4/1993 | European Pat. Off. . |
| 0 549 314 A1 | 6/1993 | European Pat. Off. . |
| 0 583 873 A2 | 2/1994 | European Pat. Off. . |
| 41 34 988 A1 | 4/1992 | Germany . |
| 124667 | 5/1988 | Japan . |
| 342359 | 11/1992 | Japan . |

*Primary Examiner*—Mark J. Reinhart
*Attorney, Agent, or Firm*—David G. Conlin; Brian L. Michaelis

[57] ABSTRACT

An image forming apparatus including a bit map data generating section for generating binary dot data for each color from image data, an image memory for storing the dot data, an edge dot discriminating section for discriminating edge dots positioned in an edge section, such as a curved-line section, a slanted-line section of characters, graphics, photo images, etc. in dot data for black stored in the image memory, and a dot modulating circuit for modulating the dot data so that the edge dots and printing dots other than black ones become smaller than black printing dots other than the edge dots. With this arrangement, since linear tone can be obtained even in a section with a deep color, excellent tone can be obtained in multi-color printing such as full-color printing. Therefore, reproducibility of tone of binarized image data can be improved, and jaggedness in an edge section can be improved so as to have a smooth line.

7 Claims, 15 Drawing Sheets

FOCUSED DOT D

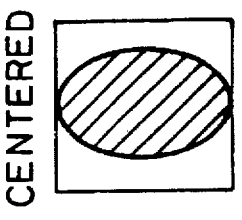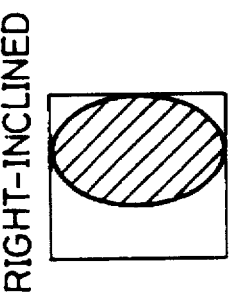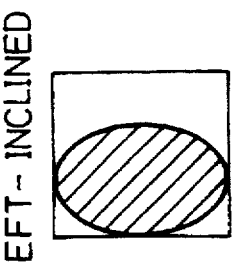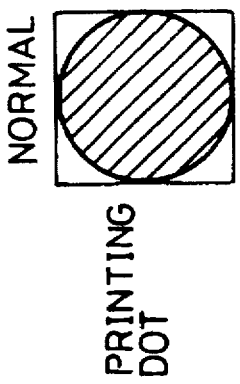
FIG.7(a) NORMAL FIG.7(b) LEFT-INCLINED FIG.7(c) RIGHT-INCLINED FIG.7(d) CENTERED
PRINTING DOT
PULSE PATTERN

IMAGE FORMING APPARATUS

FIELD OF THE INVENTION

The present invention relates to an image forming apparatus, such as a laser printer, a digital printer, a facsimile, a scanner printer, a copying machine.

BACKGROUND OF THE INVENTION

In recent years, as an image forming apparatus which is capable of obtaining multi-color printing such as full-color printing by superimposing each color: black; yellow; magenta and cyan, a laser printer has been in common use. Such a laser printer uses a binary signal which is composed of a printing bit and a non-printing bit as image data. Moreover, when image data with half tone such as graphics, photo images (namely, printing dots) are produced, a laser printer reproduces tone through pseudo intermediate tone by an areal tone method.

As shown in FIG. 18, the above-mentioned conventional laser printer adopts circular printing dots 60 . . . having a dot diameter which is larger than a width of a writing pitch. Namely, in the conventional laser printer, an output characteristic is set so that a size of the printing dot 60 becomes larger than that of a picture element 61. This prevents occurrence of a gap between the printing dots 60 . . . , so occurrence of so-called blank, etc. in a solid section, etc. is prevented.

However, when a dot diameter of the printing dots 60 . . . is enlarged and the printing dots 60 . . . are superimposed so as to be printed, linear tone cannot be obtain as color density which is shown by superimposing becomes deeper. As shown in FIG. 19, for example, in the case where the printing dots 60 . . . are printed on transfer paper in parallel crosses, an area where the printing dots 60 . . . were printed (namely, a printed area) becomes larger than an area where the printing dots 60 . . . were not printed (namely, a non-printed area). For this reason, obtained print tone is different from desired tone, namely, a color becomes deep.

Therefore, in order to solve the above problem, Japanese Unexamined Patent Publication No. 63-124667/1988 (Tokukaisho 63-124667) discloses an image forming apparatus which changes a dot diameter of printing dots according to arrangements of another printing dots and non-printing dots which surround the printing dots (namely, dot patterns). This image forming apparatus is arranged so as to improve reproducibility of tone of binarized image data by changing a dot diameter of printing dots.

However, since the above-mentioned conventional image forming apparatus changes a dot diameter of printing dots without distinguishing colors of the printing dots (black, yellow, magenta and cyan), there arises a problem that tone becomes unclear in multi-color printing such as full-color printing in which characters, graphics and photo images, etc. are intermingled, for example.

In other words, characters, etc. are seldom shown by half tone and are mostly shown by only black component (namely, monochrome), but graphics, photo images, etc. are mostly shown by half tone other than black. For this reason, when a dot diameter of printing dots of yellow, magenta and cyan is respectively changed according to a dot pattern, the printing dots of each color are printed with them displaced one another, namely, so-called color displacement occurs. Therefore, as to multi-color print to be obtained, its tone becomes defective. Moreover, in multi-color printing where characters, graphics, photo images, etc. are intermingled, jaggedness in an outline section of characters, graphics, etc. is outstanding due to the color displacement, so smooth lines cannot be obtained.

Here, in order to dissolve the above problem, Japanese Unexamined Patent Publication No. 4-342359/1992 (Tokukaihei 4-342359) discloses an image forming apparatus to which a first memory for storing image data of characters, etc. and a second memory for storing image data of graphics, photo images, etc. are provided. After performing different modulation on image data read out from the first memory and image data read out from the second memory, this image forming apparatus synthesizes the both image data so as to obtain a binary signal.

However, with this arrangement, in order to discriminate whether the image data are image data of characters, etc. or image data of graphics, photo images, etc., a complicated discriminating circuit as well as the first memory and the second memory must be provided, and further, their controlling method is complex. For this reason, there arises a new problem that an image forming apparatus cannot be provided at a low price.

SUMMARY OF THE INVENTION

An object of the present invention is attained from a viewpoint that while characters, etc. are mostly represented by only black component (namely, black and white), graphics, photo images, etc. are mostly represented by half tone other than black. Namely, the present invention is invented in view of the above conventional problem, and it is an object of the present invention to provide an image forming apparatus which is capable of removing jaggedness in an outline section of characters, graphics, etc. (dejagging) even if discrimination is not made as to whether image data are image data of characters, etc. or image data of graphics, photo images, etc., so as to have a smooth line and also of obtaining excellent tone in multi-color printing such as full-color printing at a low price.

In other words, it is an object of the present invention to provide an image forming apparatus which is capable of improving reproducibility of tone of binarized image data even if a complicated discriminating circuit and a controlling method, etc. are not used, and also of removing jaggedness in an outline section of characters, graphics, etc. so as to have a smooth line at a low price.

In order to achieve these objects, an image forming apparatus for printing an image to be printed by forming the image by a plurality of printing dots with a plurality of colors including black is characterized by including:

dot data generating means for generating binary dot data for each color from image data;

storing means for storing the dot data;

edge dot discriminating means for discriminating edge dots positioned in an outline section of an image to be printed in black dot data stored in the storing means; and modulating means for modulating the dot data so that the edge dots and the printing dots other than black ones become smaller than the black printing dots other than the edge dots.

With the above arrangement, the dot data generating means generates binary dot data for each colour from image data. The edge dot discriminating means discriminates edge dots positioned in an outline section of image to be printed in the black dot data stored in the storing means. The modulating means modulates the dot data so that the edge dots and printing dots other than black ones become smaller than the black printing dots other than the edge dots.

Generally, while characters, etc. in images to be printed are mostly composed of black printing dots, graphics, photo images, etc. are mostly composed of printing dots other than black ones. For this reason, even if discriminating is not made as to whether image data are image data of characters, etc. or image data of graphics, photo images, etc., edge dots are discriminated in black dot data by the edge dot discriminating means, and the dot data are modulated by the modulating means, thereby removing jaggedness in an outline section of characters, graphics, etc. (dejagging) and it is possible to have a smooth line. Moreover, the dot data are modulated by the modulating means, thereby obtaining linear tone in a section with a deep color, so excellent tone can be obtained in multi-color printing such as full-color printing.

This makes it possible to improve reproducibility of tone of binarized image data and to remove jaggedness in an outline section of characters, graphics, etc. so as to have a smooth line. Furthermore, since a complicated discriminating circuit and a complicated controlling method, etc. for discriminating the image data of characters, etc. from the image data of graphics, photo images, etc. are not required, it is possible to provide an image forming apparatus at a low price.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) through FIG. 7(d) are explanatory drawings which show printing dots modulated by a dot modulating circuit of the printer.

DESCRIPTION OF THE EMBODIMENTS

The following will discuss one embodiment of the present invention referring to FIGS. 1 through 14. Here, in the following explanation, a laser printer is illustrated as an image forming apparatus.

Figure 2:
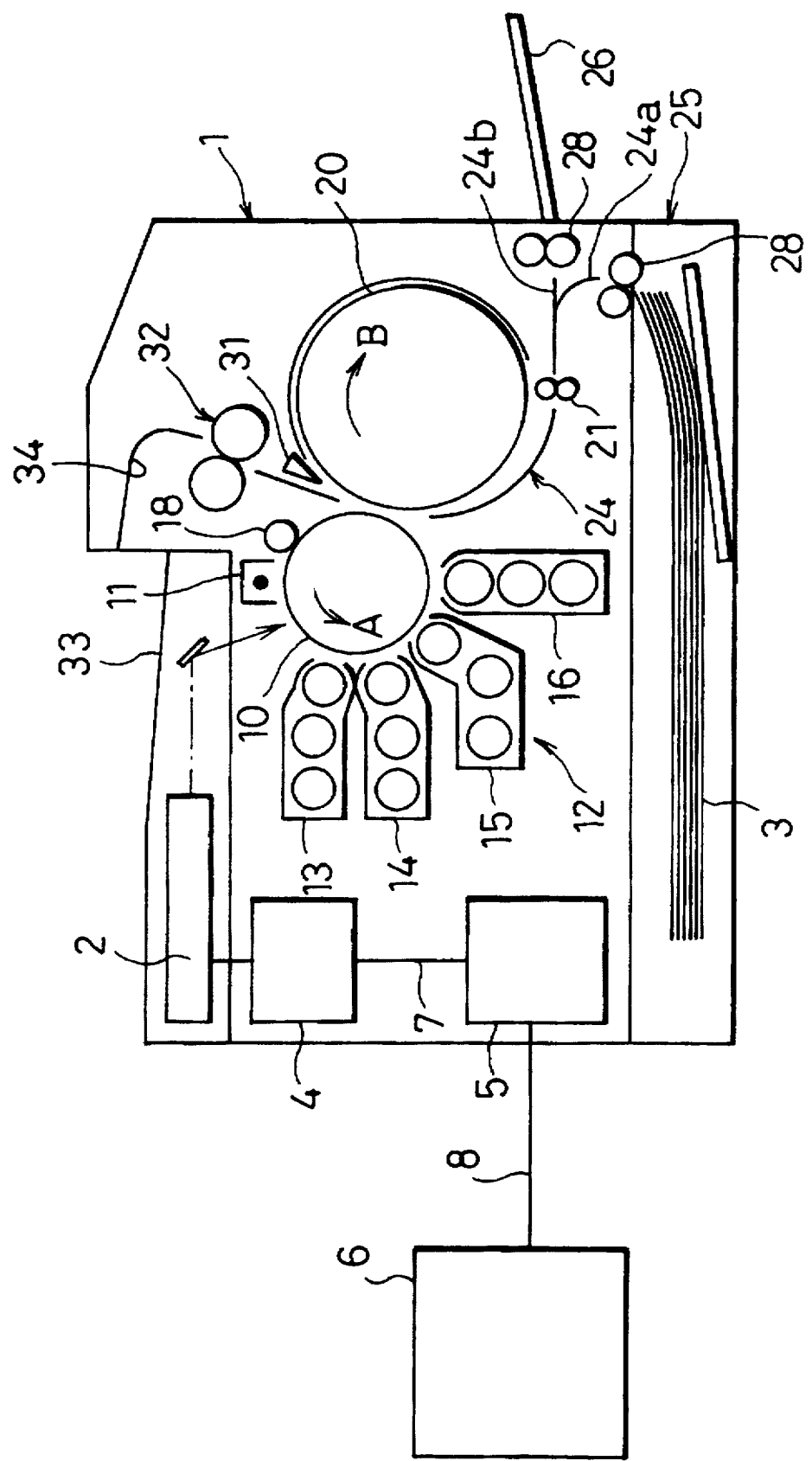
FIG. 2 is a block diagram which shows a schematic arrangement of a main section of the printer.

As shown in FIG. 2, a color laser beam printer (hereinafter, simply referred to as a printer) of the present invention includes an optical unit 2, which is composed of a semiconductor laser optical system (not shown), in an upper end part of a printer main body 1, a printer controller 4 and an image processor 5 in a prescribed position of the printer main body 1.

The optical unit 2 has a semiconductor laser, a polygon mirror, a f-θ lens, etc. (all of them are not shown). The semiconductor laser irradiates a laser beam (indicated by alternate long and short dashes lines) according to a video signal inputted from the printer controller 4. The polygon mirror rotates so as to reflect the laser beam, and deflects the laser beam in a constant angular velocity. The f-θ lens compensates for the deflected laser beam so that the laser beam is deflected in a constant angular velocity on a photoreceptor drum 10.

The laser beam irradiated from the optical unit 2 is irradiated to the photoreceptor drum 10 which is capable of rotating in a direction shown by arrow A in the drawing so as to be successively scanned, and an electrostatic latent image is formed on the photoreceptor 10. Moreover, a charger 11 for charging a surface of the photoreceptor drum 10 so as to impart a predetermined potential prior to an exposure executed by the optical unit 2 is provided on the periphery of the photoreceptor drum 10. Further, a developing unit 12, a transfer drum 20, a cleaning unit 18, a charge eliminating lamp, not shown, etc. are arranged in this order starting with the charger 11 in a direction that the photoreceptor drum 10 rotates. The developing unit 12 supplies toner to the electrostatic latent image on the photoreceptor drum 10 so as to form a toner image. The transfer drum 20 holds transfer paper 3 with the transfer paper wound around the surface of the transfer drum 20 so as to transfer the toner image onto the transfer paper 3. The cleaning unit 18 scrapes residual toner off from the photoreceptor drum 10. The charge eliminating lamp eliminates a residual electric potential from the photoreceptor drum 10 prior to next charging.

The developing unit 12 includes an yellow developer vessel 13, a magenta developer vessel 14, a cyan developer vessel 15 and a black developer vessel 16, and those developer vessels 13 through 16 respectively house toner having corresponding colors. Moreover, the respective developer vessels 13 through 16 are released when toner is supplied, but a shutter (not shown) for usually shutting them is provided thereto.

In addition, the transfer drum 20 is provided so as to be capable of rotating in a direction of arrow B in the drawing, and it holds the transfer paper 3 by winding up the transfer paper 3 around the surface of the transfer drum 20. Then, when the held transfer paper 3 contacts with the photoreceptor drum 10, the transfer drum 20 transfers the toner image on the photoreceptor drum 10 onto the transfer paper 3 utilizing a potential difference between an electric charge of the toner image on the photoreceptor drum 10 and an electric charge on the surface of the transfer paper 3 (mentioned later).

A transfer paper transport path 24 including a pair of register rollers 21 is formed on a paper-feeding side of the transfer drum 20. The above mentioned pair of register rollers 21 supplies the transfer paper 3 to the transfer drum 20 at predetermined intervals. The transfer paper transport path 24 has a feeding transport path 24a and a manual insertion transport path 24b which are joined. A feeding cassette 25 for storing transfer paper 3 . . . is provided on an upper flow side of the feeding transport path 24a, and a pair of transporting roller 28 and a feeding roller (not shown), etc. for transporting the transfer paper 3 . . . are provided in the feeding transport path 24a. The feeding roller feeds the transfer paper 3 . . . stored in the feeding cassette 25 one by one to the feeding transport path 24a. A feeding section 26 where the transfer paper 3 is manually inserted is provided on an upper flow side of the manual insertion transport path 24b, and the pair of transporting roller 28, etc. are provided in the manual insertion transport path 24b. The feeding section 26 includes a manual insertion guide, not shown.

The transfer drum 20 is composed of an insulator, and its surface is composed of a dielectric. Moreover, a charger (not shown) for applying a high voltage to the transfer drum 20 is provided inside the transfer drum 20. For this reason, when the charger, not shown, applies a high voltage from the inside to the transfer drum 20, electric charges are accumulated on the insulator, so electric charges are induced on the dielectric of the surface. Then, the transfer paper 3 is wound up around the transfer drum 20 by electrostatic absorption due to electric charges induced on the surface so that the transfer drum 20 holds the transfer paper 3. Moreover, electric charges are induced by the electric charges on the transfer drum 20 on a surface of the transfer paper 3 which is held on the surface of the transfer drum 20. Here, the electric charges on the surface of the transfer paper 3 are set so as to become higher than those of the toner image on the photoreceptor drum 10.

A transfer roller (not shown) is provided below the transfer drum 20. The transfer roller presses the transfer paper 3 carried by the pair of register rollers 21 against the transfer drum 20 and winds the transfer paper 3 around the surface of the transfer drum 20. The transfer roller is grounded. Moreover, a clipper (not shown) for supporting a winding operation of the transfer paper 3 around the surface of the transfer drum 20 by the transfer roller is provided in a prescribed position of the transfer drum 20.

In addition, a peeling claw 31, a fixing device 32 and a pair of discharge rollers (not shown), etc. are provided a transfer paper transport path 34 on a discharge side of the transfer drum 20. The peeling claw 31 which is detachable from the transfer drum 20 forcibly peels the transfer paper 3 to which toner has been transferred from the transfer drum 20. The fixing device 32 heats and fuses an toner image onto the transfer paper 3. The pair of discharge rollers discharge the transfer paper 3 on which the toner image has been fixed onto a discharge tray 33. Here, an operation panel, not shown, is provided on an upper surface of the printer main body 1. The operation panel includes ten keys, which set a number of printing, a variable magnification, etc., a print start key, etc.

The printer controller 4 is connected to the optical unit 2 and is also connected to the image processor 5 through a video interface cable 7. The printer controller 4 outputs a video signal, which is inputted from the image processor 5 through the video interface cable 7, to the optical unit 2, and controls an ON/OFF operation of a semiconductor laser in the optical unit 2 according to the video signal. In other words, the printer controller 4 generates a laser signal for driving a semiconductor laser according to a video signal. Moreover, the printer controller 4 controls operations in each section of the printer according to various control signals which are inputted from an outer host computer 6 through the image processor 5 and various operation signals such as the print start signal which is inputted from a key operation of the operation panel.

The above-mentioned host computer 6 is provided in a host device, not shown, which is an external unit. The host device includes a document reading optical system, such as an image scanner, an image sensor, and an input device, such as a key board. The host computer 6 suitably outputs a print data signal inputted from the input device to the printer, and meanwhile outputs various control signals to the printer.

The image processor 5 is connected to the printer controller 4 through the video interface cable 7, and is also connected to the host computer 6 through an interface cable 8. The image processor 5 gives a prescribed process to a print data signal inputted from the host computer 6 through the interface cable 8 so as to generate a video signal from the print data signal. Then, the image processor 5 outputs the video signal to the printer controller 4 through the video interface cable 7.

The video signal generated from the print data signal is a binary signal composed of a printing bit and a non-printing bit and is a signal for transmitting image data. The semiconductor laser of the optical unit 2 is in an ON state when the printing bit is inputted and forms printing dots on the photoreceptor drum 10. Meanwhile, the semiconductor laser is in an OFF state when the non-printing bit is inputted, and does not form printing dots on the photoreceptor drum 10. Namely, the image data to be transmitted by the video signal are binarized dot data which are composed of printing dots and non-printing dots.

Figure 3:
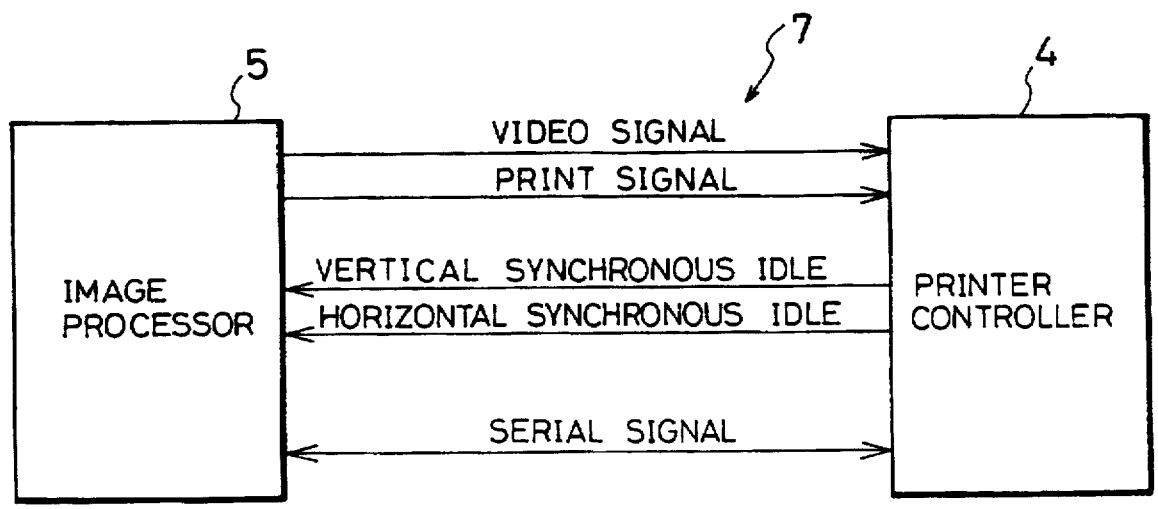
FIG. 3 shows an arrangement of a main section of the printer and is a block diagram which shows a relationship between an image processor and a printer controller.

As shown in FIG. 3, the video interface cable 7 includes a video signal line for transmitting a video signal, a signal line for transmitting a print signal, a synchronous idle line for transmitting a synchronous idle and a communication line for serially communicating.

Figure 4:
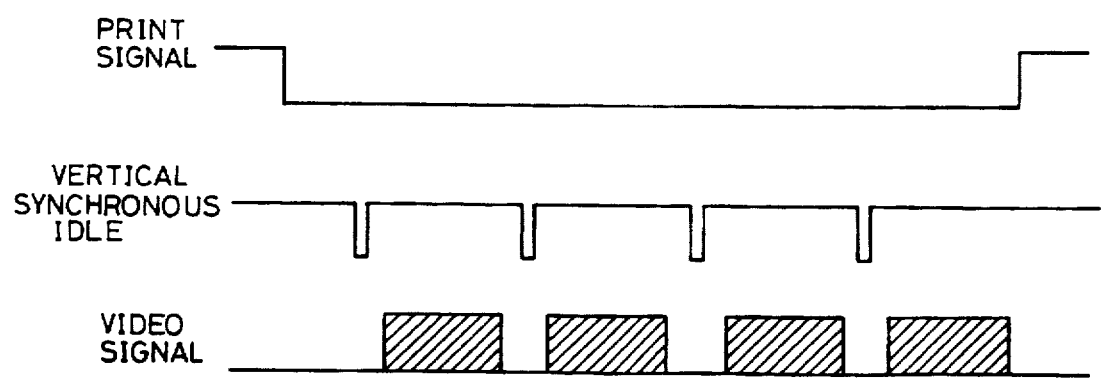
FIG. 4 is a timing chart of a signal which is inputted/outputted between the image processor and the printer controller.

The print signal is a signal for instructing the printer controller 4 to start an operation of the printer, and it is sent from the host computer 6, for example. As shown in FIG. 4, the printer controller 4 becomes active (low level active) when the print signal is in a low level.

The synchronous idle includes a vertical synchronous idle (VSYNC) and a horizontal synchronous idle (HSYNC). The printer controller 4 outputs the synchronous signal to the image processor 5 so as to maintain synchronization of the video signal transmitted from the image processor 5. In other words, the video signal synchronizes with the synchronous idle by means of a synchronous transmission system, and is outputted from the image processor 5 to the printer controller 4.

As shown in FIG. 4, the printer controller 4 keeps the vertical synchronous idle in a low level for a fixed time and outputs the vertical synchronous idle to the image processor 5 so as to instruct the image processor 5 to start outputting a video signal for black, yellow, magenta and cyan (for convenience, shown by hatching in the drawing).

Here, the printer of the present embodiment provides multi-color printing, such as full-color printing by superimposing black, yellow, magenta and cyan. Besides 4-color printing, 3-color printing and black-and-white printing, the printer can perform specific-color printing, such as single-color printing using yellow, 2-color printing using black and yellow by each command, mentioned later.

In the communication line of the video interface cable 7, the following serial communication is performed. Namely, each command, such as a print start-up command, a color-specifying command, is outputted from the image processor 5 to the printer controller 4. Moreover, a signal which shows an operation state (so-called status) of the printer controller 4 is outputted from the printer controller 4 to the image processor 5.

Figure 1:
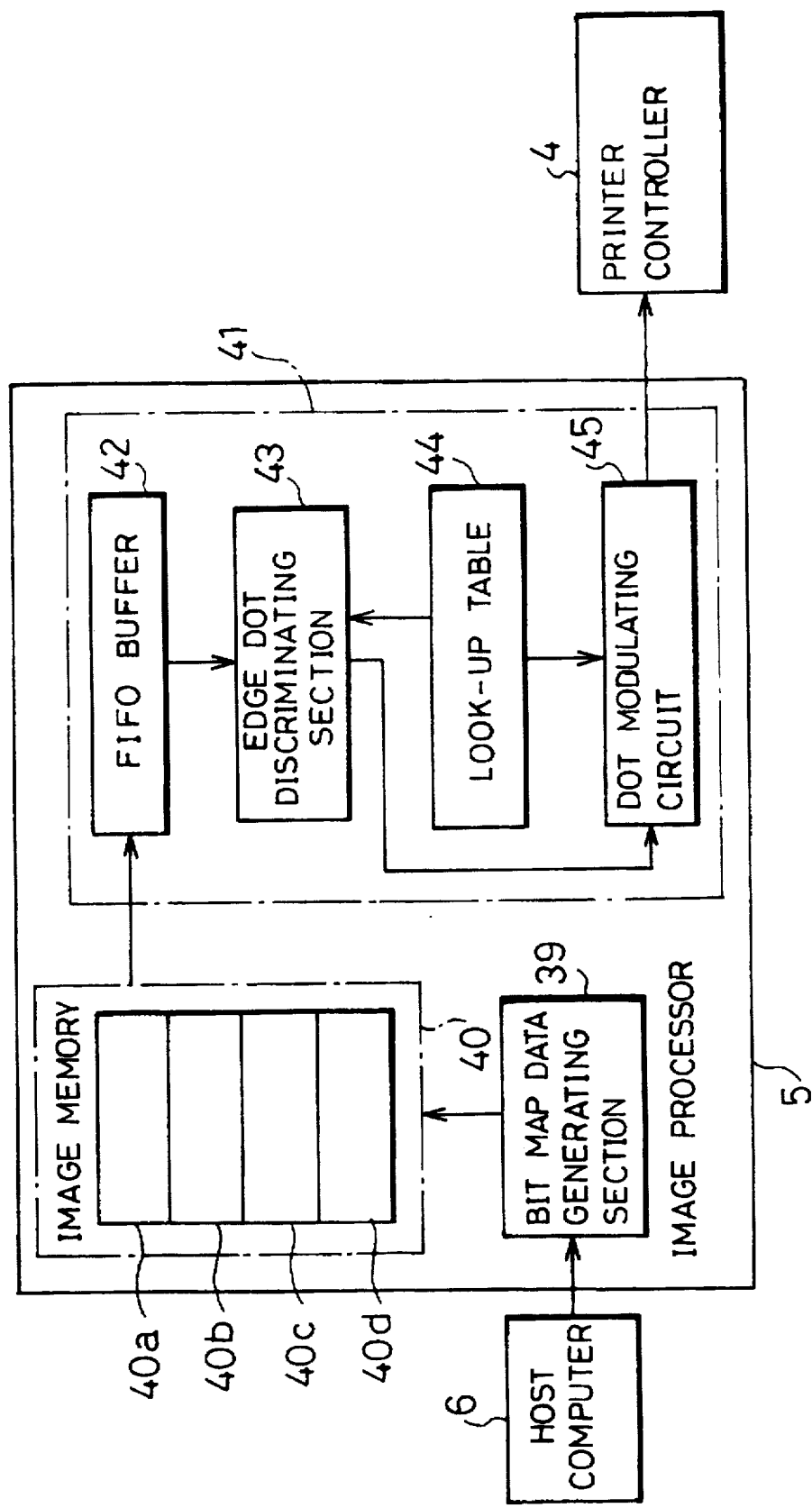
FIG. 1 is a block diagram which shows an arrangement of a main section of a printer as an image forming apparatus in one embodiment of the present invention.

As shown in FIG. 1, the image processor 5 includes a bit map data generating section 39, an image memory 40 and an image processing section 41. The bit map data generating section (dot data generating means) 39 generates a video signal from the print data signal, which is inputted from the host computer 6, and separates image data to be transmitted by the video signal into components for each color (namely, printing dots). At this time, the bit map data generating section 39 binarizes image data of characters, etc. and half-tone image data of graphics photo images, etc. using an areal tone method, such as a dither method. Then, the bit map data generating section 39 generates bit map data for each color according to each color density.

The areal tone method is a method of changing an area rate of dots of color with constant density contained in per unit area. In other words, the areal tone method is a method of changing the area rate by changing a number of dots of color with constant density in a matrix composed of several dots to dozens of dots. In the areal tone method, tone of binarized image data is reproduced in such a manner. Moreover, as the dither method, any of an independent dither method, a random dither method, a fattening-type systematic dither method, a Bayer-type systematic dither method and a conditional dither method may be used. Further, instead of the dither method, a density patterning method can be also used.

Here, in the bit map data generating section 39, a method of generating bit map data utilizing font data corresponding to a character code can be used instead of the areal tone method as a method of binarizing image data of characters, etc. In this case, the bit map data generating section 39 extracts features of characters, etc. from the image data by means of a so-called isolated graphic separation method, a stroke extracting separation method, a registration method, a feature extraction method or a structural analysis method so that characters, etc. are recognized by this method. Therefore, in the case where this method is used, the bit map data generating section 39 is arranged so as to include a memory, not shown, and the memory stores font data and various data which are required for the above character recognition.

The image memory (storing means) 40 is composed of memories 40a, 40b, 40c and 40d for storing each image data for black, yellow, magenta and cyan. Each memory 40a through 40d is composed of a RAM (Random Access Memory), and is independent. The memories 40a through 40d have at least a storage capacity for storing each image data for 1 page of transfer paper. The image memory 40 stores the above respective image data which are transmitted from the bit map data generating section 39. Namely, the image data for each color composed of bit map data are stored to prescribed memories 40a through 40d in the image memory 40. The respective image data stored into the image memory 40 are suitably read out by an image processing section 41 as necessary.

The image processing section 41 is composed of an FIFO (first-in first-out) buffer 42, an edge dot discriminating section 43, a look-up table 44 and a dot modulating circuit 45. The FIFO buffer 42 temporarily holds the image data read out from the image memory 40 and transmits the held image data to the edge dot discriminating section 43 by FIFO. Here, a video signal which transmits the image data synchronizes with a horizontal synchronous idle so as to be outputted from the image memory 40 to the FIFO buffer 42.

As mentioned later, the edge dot discriminating section (edge dot discriminating means) 43 performs a discriminating process for discriminating edge dots from dot data which are the image data. The look-up table (edge dot discriminating means, modulating means) 44 is composed of a ROM (Read Only Memory) and stores a dot pattern which is used when the discriminating process is performed and a pulse pattern which is used when a size and a shape of edge dots are changed. Here, in the following explanation, for convenience, the image data are suitably referred to as dot data. Moreover, edge dots represent printing dots which agree with the dot pattern stored in the look-up table 44 in the printing dots positioned on a border between an edge section of a curve line section, a slanted line section of characters, graphics, photo images, etc. which are images to be printed (outline section) and a blank section not to be printed.

Figure 5:
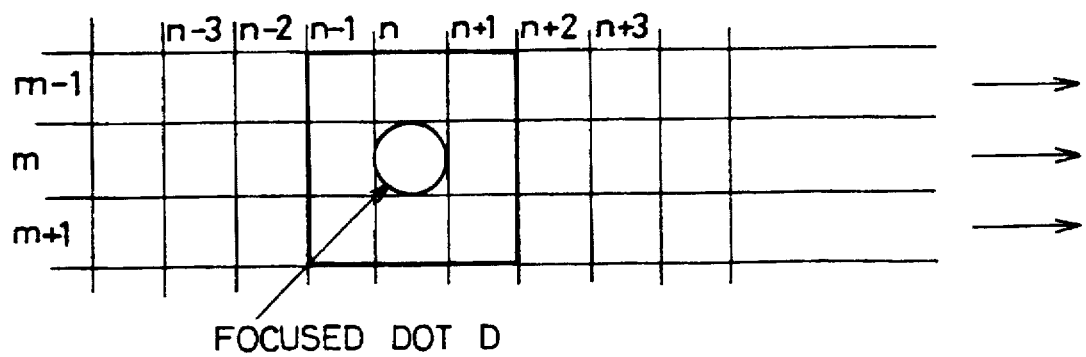
FIG. 5 is an explanatory drawing which shows a matrix which is used when edge dots are discriminated in an edge dot discriminating section of the printer.

The edge dot discriminating section 43 performs a discriminating process on dot data which are image data for black so as to discriminate edge dots. This utilizes that characters, etc. are seldom represented by half tone but are mostly represented by only black component (namely, black and white). As shown in FIG. 5, the edge dot discriminating section 43 compares a dot pattern composed of a matrix of 3×3 which centers on dot data to be discriminated (hereinafter, referred to as focused dot D) with the dot pattern stored in the look-up table 44. Successively, when the dot pattern including the focused dot D and the stored dot pattern are equal, the edge dot discriminating section 43 discriminates the focused dot D as an edge dot. Further, the edge dot discriminating section 43 discriminates all the dot data, namely, all the printing dots in the above manner.

When the focused dot D is positioned in an m-numbered line in an n-numbered row, for example, the matrix is composed of the focused dot D, a dot positioned in (m−1)-numbered line in (n−1)-numbered row, a dot positioned in (m−1)-numbered line in n-numbered row, a dot positioned in (m−1)-numbered line in (n+1)-numbered row, a dot positioned in m-numbered line in (n−1)-numbered row, a dot positioned in m-numbered line in (n+1)-numbered row, a dot positioned in (m+1)-numbered line in (n−1)-numbered row, a dot positioned in (m+1)-numbered line in n-numbered row and a dot in (m+1)-numbered line in (n+1)-numbered row.

Here, the edge dot discriminating section 43 does not perform a discriminating process on each image data for yellow, magenta and cyan so as to discriminate edge dots. Therefore, the edge dot discriminating section 43 performs the above discriminating process only on the image data for black, and image data other than the image data for black are directly transmitted to the dot modulating circuit 45.

FIG. 6 shows four dot patterns in a plurality of dot patterns stored in the look-up table 44 as an example. The dot patterns in FIG. 6(a) and FIG. 6(b) show a dot pattern in the case where the border between the edge section and the blank section slants to the upper-right and characters, graphics, etc. to be printed exist on a lower side. The dot pattern in FIG. 6(c) shows a dot pattern in the case where the border slants to the lower-right and characters, graphics, etc. exist on an lower side. The dot pattern in FIG. 6(d) shows a dot pattern in the case where the border slants to the lower-right and characters, graphics, etc. exist on an upper side. Here, besides the dot patterns illustrated above, various dot patterns which correspond to a relationship between a direction of the border (slant to the upper-right, slant to the lower-right, etc.) and a position of characters, graphics, etc. (upper side, lower side) are stored to the look-up table 44.

The dot modulating circuit (modulating means) 45 reads out a pulse pattern which corresponds to an edge dot from the look-up table 44 according to a result of the discriminating process which has been performed in the edge dot discriminating section 43. The dot modulating circuit 45 replaces the pulse pattern of the edge dot with the read out pulse pattern. Then, the dot modulating circuit 45 transmits the edge dot, which has been modulated by the replacement, to the printer controller 4. In other words, the dot modulating circuit 45 outputs a video signal to the printer controller 4.

In addition, as to dot data other than the dot data for black, the dot modulating circuit 45 replaces the pulse pattern of the printing dots of the dot data with the pulse pattern read out from the look-up table 44. Then, the dot modulating circuit 45 transmits the printing dot, which has been modulated by the replacement, to the printer controller 4. Namely, the dot modulating circuit 45 outputs a video signal to the printer controller 4.

Figure 6A:
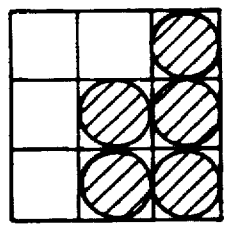
FIG. 6(a) through FIG. 6(d) are explanatory drawings which show one example of a dot pattern which is used when the edge dots are discriminated.
Figure 6B:
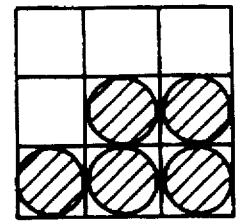
Figure 6C:
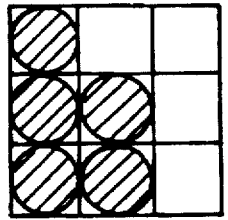
Figure 6D:
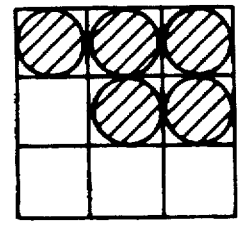

The edge dots which have been modulated in the above manner are shown in FIG. 7 together with pulse patterns (pulse widths). FIG. 7(b) shows the case the edge dot which agrees with the dot pattern shown in FIG. 6(c) is modulated. In this case, the modulated edge dot becomes a left-inclined printing dot. FIG. 7(c) shows the case where the edge dot which agrees with the dot patterns shown in FIG. 6(a), 6(b) and 6(d) is modulated. In this case, the modulated edge dot becomes a right-inclined printing dot.

In addition, FIG. 7(a) shows a printing dot which does not agree with the dot pattern of the edge dot, namely, a normal printing dot other than the edge dot. A dot diameter in a widthwise direction in the printing dot other than the edge dot becomes larger than a width of a writing pitch of the printing dot. For this reason, a gap does not occur between the printing dots, thereby preventing occurrence of so-called blank in a solid section, etc., for example.

Figure 8:
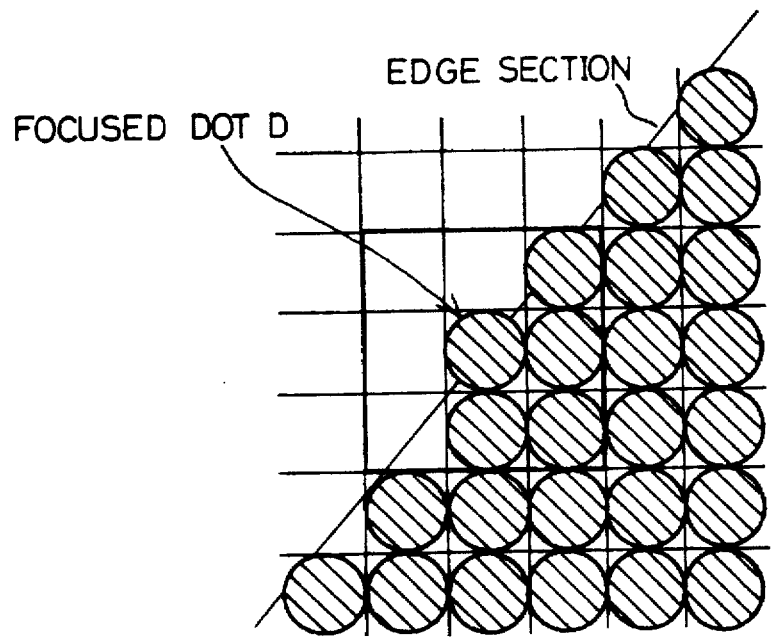
FIG. 8 is an explanatory drawing which shows edge dots before modulation by the dot modulating circuit.

As shown in FIG. 8, for example, in the case where a border between the edge section and the blank section slants to the upper-right and characters, graphics, etc. to be printed exist on a lower side, the dot pattern including the focused dot D agrees with the dot pattern shown in FIG. 6(a).

Figure 9:
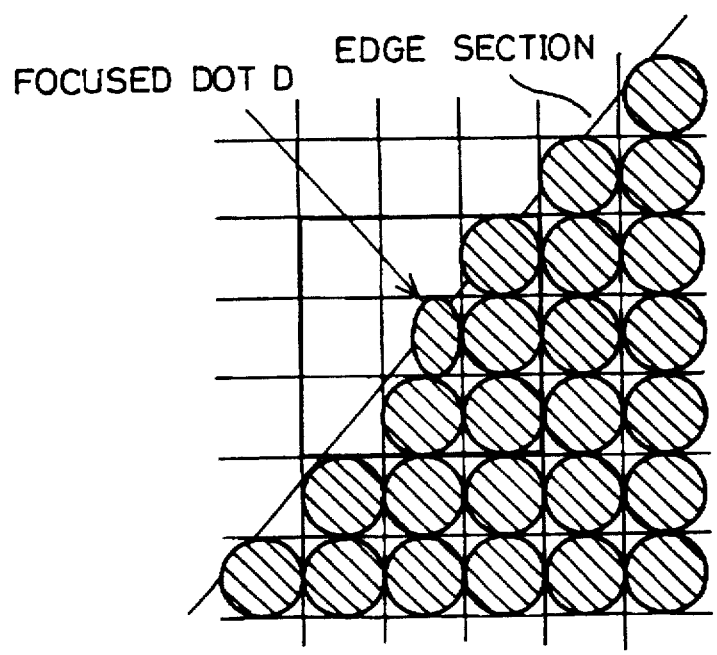
FIG. 9 is an explanatory drawing which shows edge dots after modulation by the dot modulating circuit.

Therefore, the edge dot discriminating section 43 discriminates that the focused dot D is an edge dot. The dot modulating circuit 45 reads out a pulse pattern, which corresponds to the focused dot D which has been discriminated as an edge dot, from the look-up table 44 and modulates the pulse pattern of the focused dot D in the above manner. In other words, the dot modulating circuit 45 modulates the focused dot D to the right-inclined printing dot shown in FIG. 7(c). The image processor 5 changes a size and a shape of the focused dot D which has been discriminated as an edge dot and removes jaggedness in an edge section of characters, graphics, etc. shown in FIG. 8 (dejagging) so as to have a smooth line as shown in FIG. 9. Here, as to a size of the printing dots in FIGS. 8 and 9, for convenience of explanation, the printing dots are illustrated such that they do not overlap one another (namely, smaller than an actual size).

In addition, FIG. 7(d) shows the case where dot data other than the dot data for black are modulated. In this case, the modulated dot data become a centered printing dot. Namely, each dot data for yellow, magenta and cyan are modulated in the above manner so as to become a centered printing dot. A dot diameter in a widthwise direction of the centered printing dot is substantially equal to a width of a writing pitch of the printing dot. For this reason, even when a color is deep, printing with linear tone can be obtained.

Figure 10:
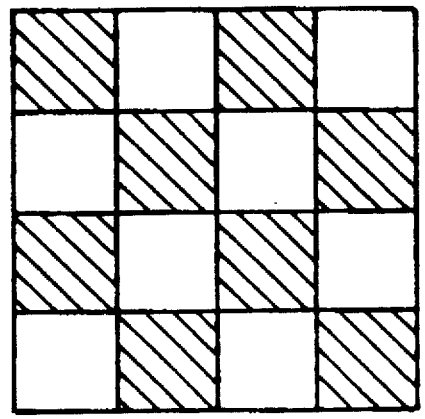
FIG. 10 is an explanatory drawing which shows one example of a dot pattern.
Figure 11:
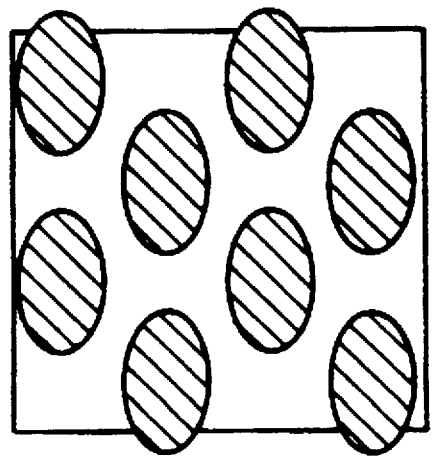
FIG. 11 is an explanatory drawing which shows printing dots after modulation by the dot modulating circuit.

For example, the dot modulating circuit 45 modulates dot data other than dot data for black shown in FIG. 10 so as to have centered printing dots shown in FIG. 11. The image processor 5 changes a size and a shape of the printing dots so as to obtain excellent tones, namely, half tone in printing of graphics, photo images, etc.

The image processor 5 with the above arrangement processes the image data for each color in a preset order according to a signal inputted from the printer controller 4 and transmits the image data for each color to the printer controller 4 in the processed order. Moreover, the image processor 5 reads a color specifying command from a print data signal and when printing with only specific color is specified by the color specifying command, the image processor 5 outputs the color specifying command to the printer controller 4. Further, in the case of a color whose image data do not exist (in the case of blank-and-white printing, for example), the image processor 5 generates a color specifying command for the color whose image data exists and outputs the color specifying command to the printer controller 4. In other words, the image processor 5 outputs the color specifying command to the printer controller 4 so as to specify a color of a toner image to be formed on the photoreceptor drum 10.

Figure 12:
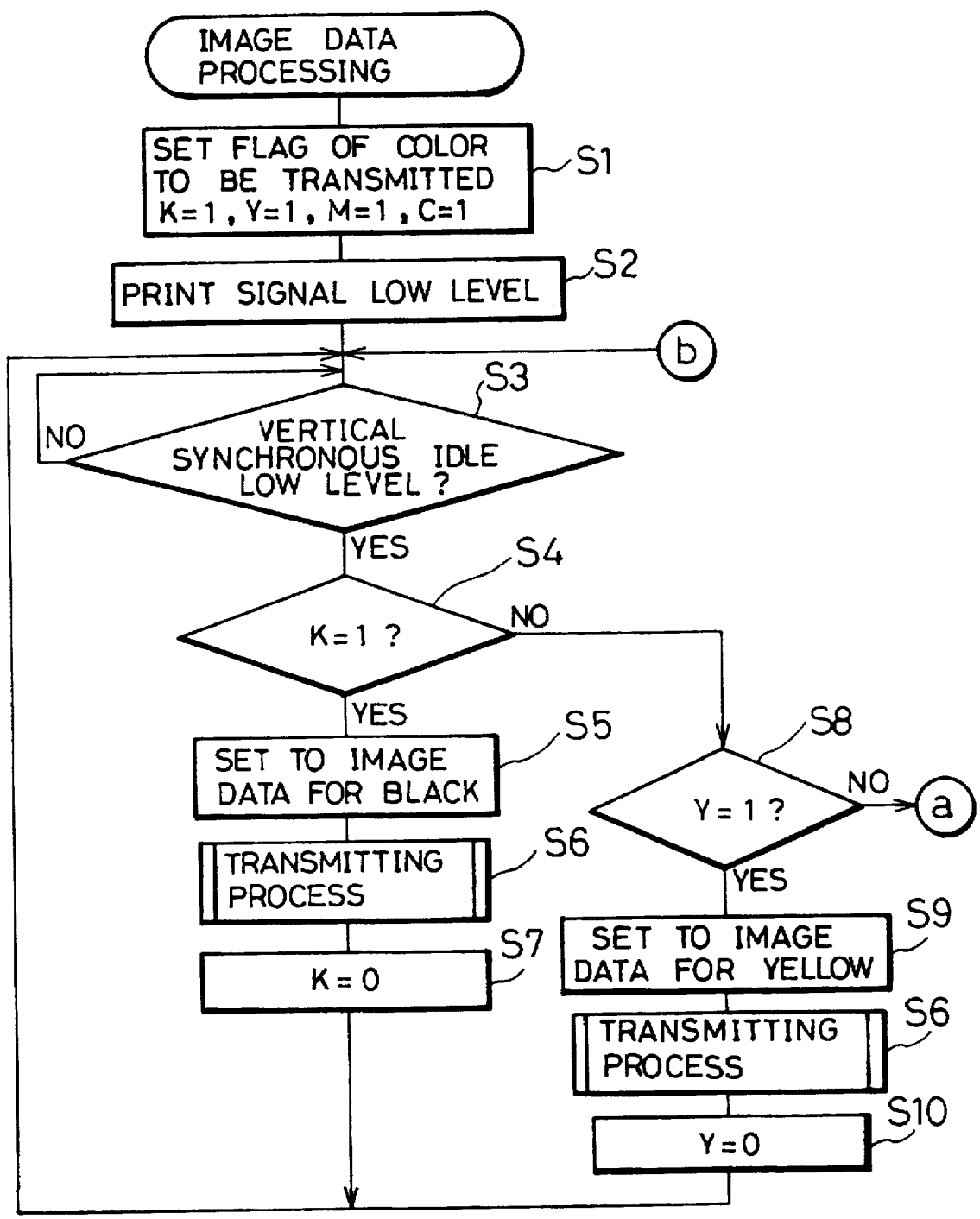
FIG. 12 is one part of a flow chart which shows a procedure for processing image data which is carried out in the image processor.
Figure 13:
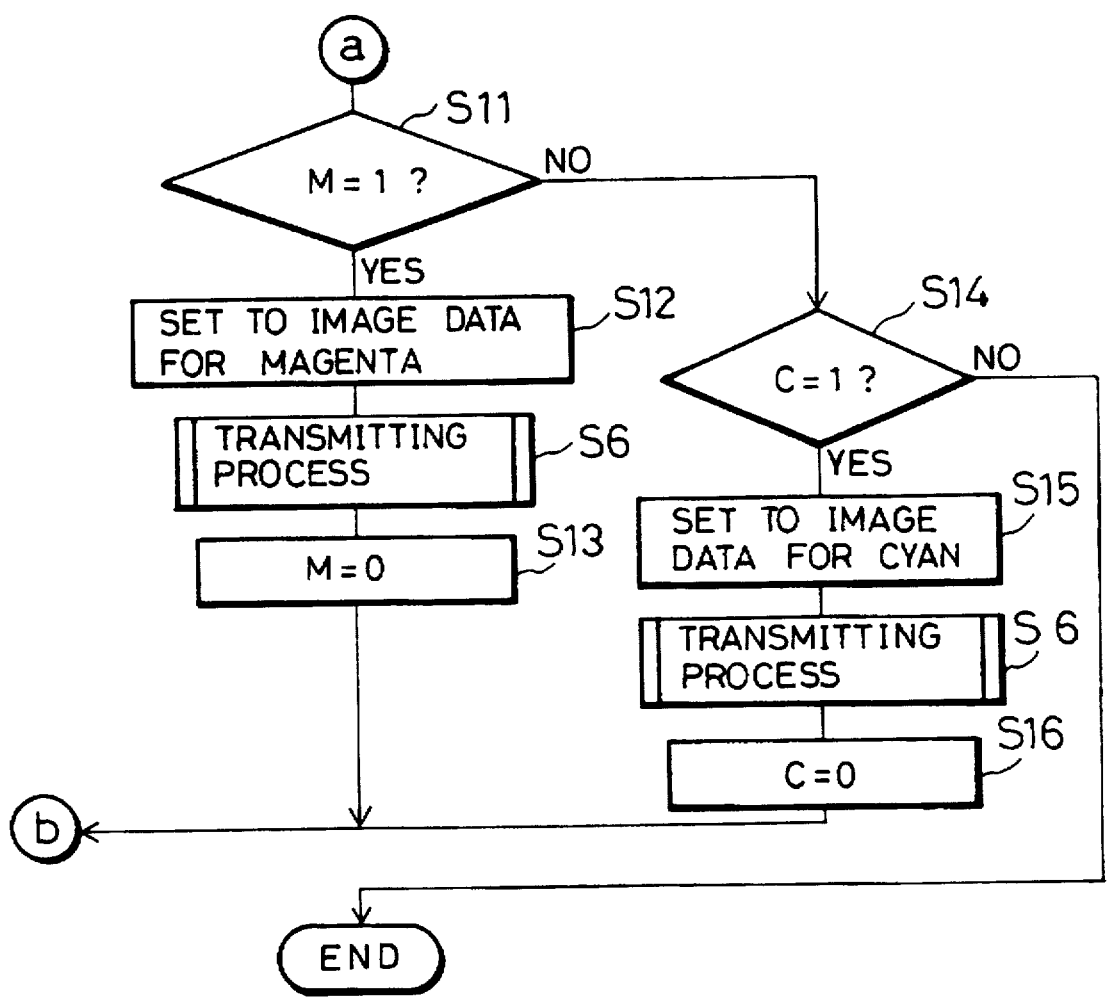
FIG. 13 is one part of a flow chart which shows the procedure for processing the image data.
Figure 14:
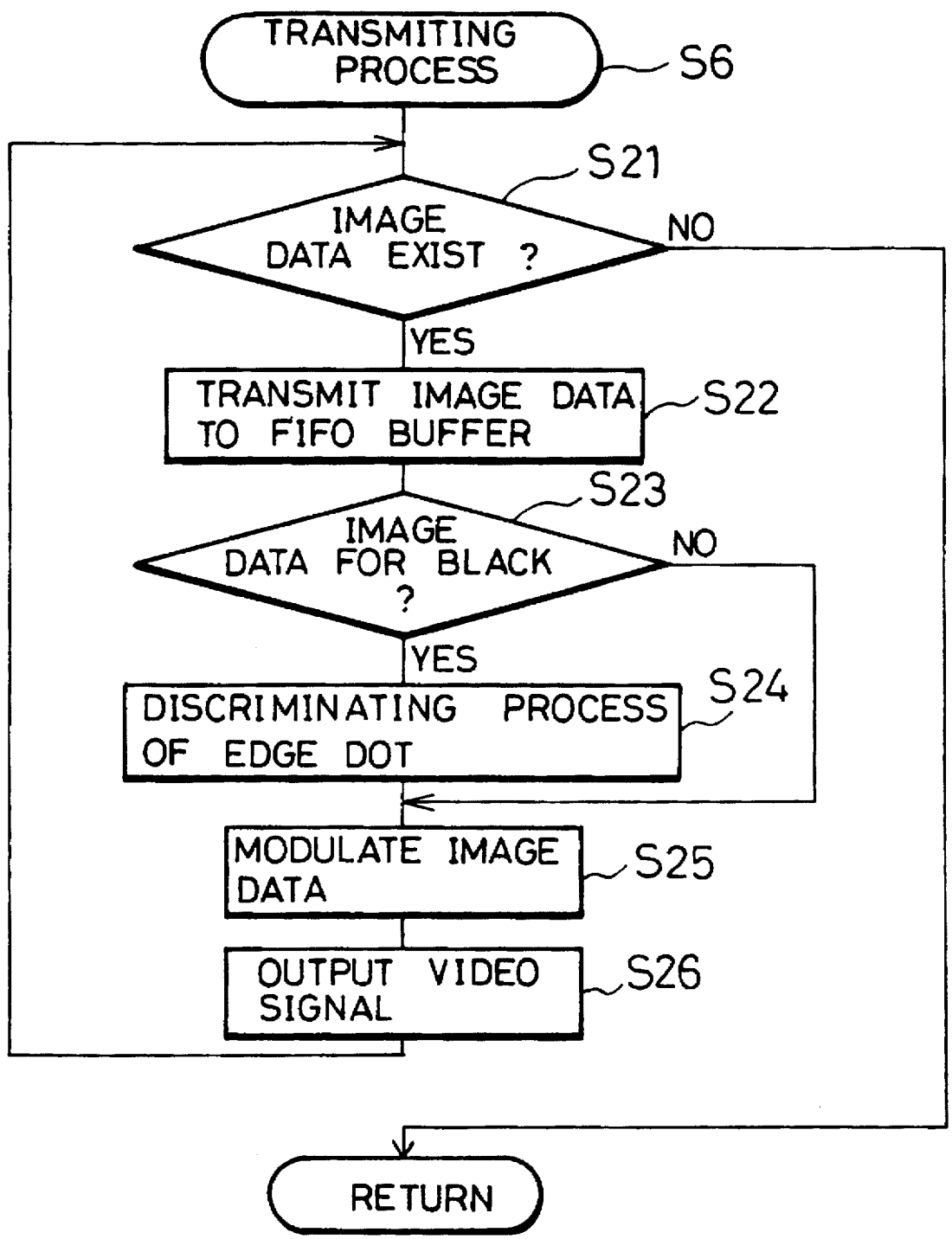
FIG. 14 is one part of a flow chart which shows the procedure for processing the image data.

The following will discuss operations for processing image data by the image processor 5 with the above arrangement referring to flow charts shown in FIGS. 12 through 14. Here, the following explanation will illustrate the case where the image processor 5 processes each image data in the order of black, yellow, magenta and cyan according to a signal inputted from the printer controller 4, namely, the case where a printer carries out 4-color printing.

First, when a print data signal is inputted from the host computer 6 to the bit map data generating section 39 in the image processor 5, the bit map data generating section 39 reads a print start command from the print data signal and starts an operation of the image data process.

The image processor 5 sets a flag of a color specified by the color specifying command, namely a color to be transmitted to the printer controller 4 as "1" (S1). In other words, a flag of black K=1, a flag of yellow Y=1, a flag of magenta M=1 and a flag of cyan C=1. Next, the image processor 5 keeps a print signal in a low level (S2) and the printer controller 4 active. As a result, the printer controller 4 controls an operation in each section of the printer and starts a printing operation as mentioned later. Successively, the image processor 5 waits for a vertical synchronous idle inputted from the printer controller 4 to be in a low level (S3). Here, the vertical synchronous idle is in a low level when the printing operation is performed by the printer controller 4 and the transfer paper 3 (FIG. 1) reaches a prescribed position.

When the vertical synchronous idle is in a low level at S3, the image processor 5 judges whether the flag of black K is "1" or not (S4). Since the flag of black K is set as "1" at S1, the judgement at S4 is YES. The image processor 5 sets a data flag as "0", for example, so as to set image data to be processed as image data for black (S5). Next, the image processor 5 transmits the image data for black (S6), and when the transmission is completed, it sets the flag of black K as "0" (S7), and the procedure goes to S3. Here, the above-mentioned transmitting process S6 will be mentioned later.

When the vertical synchronous idle is again in the low level at S3, the image processor 5 judges whether the flag of black K is "1" or not (S4). Since the flag of black K is set as "0" at S7, the judgement at S4 is NO. Next, the image processor 5 judges whether the flag of yellow Y is "1" or not (S8). Since the flag of yellow Y is set as "1" at S1, the judgement at S8 is YES. The image processor 5 sets the data flag as "1", for example, so as to set the image data to be processed as image data for yellow (S9). Successively, the image processor 5 transmits the image data for yellow (S6), and when the transmission is completed, it sets the flag of yellow Y as "0" (S10), and the procedure goes to S3.

When the vertical synchronous idle is in the low level at S3 at the third time, the image processor 5 judges whether the flag of black K and the flag of yellow Y are "1" or not (S4-S8). Both the judgements at S4 and S8 are NO. Successively, the image processor 5 judges whether the flag of magenta M is "1" or not (S11). Since the flag of magenta M is set as "1" at S1, the judgement at S11 is YES. The image processor 5 sets the data flag as "2", for example, so as to set the image data to be processed as image data for magenta (S12). Next, the image processor 5 transmits the image data for magenta (S6), and when the transmission is completed, it sets the flag of magenta M as "0" (S13), and the procedure goes to S3.

When the vertical synchronous idle is in the low level at S3 at the fourth time, the image processor 5 judges whether the flag of black K, the flag of yellow Y and the flag of magenta M are "1" or not (S4-S8-S11). All the judgements at S4, S8 and S11 are NO. Next, the image processor 5 judges whether the flag of cyan C is "1" or not (S14). Since the flag of cyan C is set as "1" at S1, the judgement at S14 is YES. The image processor 5 sets the data flag as "3", for example, so as to set the image data to be processed as image data for cyan (S15). Next, the image processor 5 transmits the image data for cyan (S6), and when the transmission is completed, it sets the flag of cyan C as "0" (S16), and the procedure goes to S3.

When the vertical synchronous idle is in the low level at S3 at the fifth time, the image processor 5 judges whether the flag of black K, the flag of yellow Y, the flag of magenta M and the flag of cyan C are "1" or not (S4-S8-S11-S14). All the judgements at S4, S8, S11 and S14 are NO. As a result, the image processor 5 ends the operation for the image data process.

In the transmitting process at S6, the image processor 5 performs the following operations. First, the image processor 5 judges whether image data to be processed exist in prescribed memories 40a through 40d in the image memory 40 (S21). When the image data exist in the memories 40a through 40d, the image processor 5 transmits the image data stored in the memories 40a through 40d to the FIFO buffer 42 (S22). Here, when the image data do not exist in the memories 40a through 40d at S21, the image processor 5 returns.

Next, the image processor 5 transmits the image data from the FIFO buffer 42 to the edge dot discriminating section 43. The edge dot discriminating section 43 judges whether the image data is image data for black based upon the value which is set in the data flag (S23). When the image data are the image data for black, the edge dot discriminating section 43 discriminates edge dots in dot data which are the image data as mentioned above (S24). When the discriminating process is completed, the edge dot discriminating section 43 transmits the image data to the dot modulating circuit 45. Moreover, when the image data are not the image data for black, namely, the image data are the image data for yellow, magenta and cyan, the edge dot discriminating section 43 directly transmits the image data to the dot modulating circuit 45 without carrying out the discriminating process.

Successively, the dot modulating circuit 45 modulates the image data (dot data) transmitted from the edge dot discriminating section 43 as mentioned above (S25). Then, the dot modulating circuit 45 transmits the modulated image data to the printer controller 4. In other words, the dot modulating circuit 45 outputs a video signal to the printer controller 4 (S26).

The image processor 5 repeats the steps S21 through S26 for a number of printing dots of dot data which are the image data. Thereafter, when the image data to be processed do not exist in the memories 40a through 40d (S21), the image processor 5 ends the operation for the transmitting process and returns.

With the above arrangement, color printing (4 color print) is carried out by the following operating procedures, namely, an electrophotographic process. First, when the charger 11 uniformly charges a surface of the photoreceptor drum 10, a first video signal, namely, first image data are transmitted from the printer controller 4 to the optical unit 2. The transmitted image data are transformed into a laser beam of black data by an ON/OFF operation of the semiconductor laser in the optical unit 2 so as to be outputted. The laser beam of the black data exposes the surface of the photoreceptor drum 10 and forms an electrostatic latent image for black in the exposed section. Successively, black toner is supplied from the black developer vessel 16 to the electrostatic latent image so that a black toner image is formed.

Meanwhile, a charger, not shown, uniformly charges a surface of the transfer drum 20 almost simultaneously with the forming of the electrostatic latent image on the photoreceptor 10. Moreover, the transfer paper 3 is supplied from the feeding cassette 25 or the feeding section 26 through the pair of register rollers 21 to the transfer drum 20. In other words, when the transfer paper 3 stored in the feeding cassette 25 is supplied, the transfer paper 3 is sent to the transfer paper transport path 24 one by one by a feeding roller, not shown, and is transported to the pair of register rollers 21 through the pair of transporting rollers 28. Moreover, when the transfer paper 3 is supplied from the feeding section 26, the transfer paper 3 is transported to the pair of register rollers 21 through the pair of transporting rollers 28.

The transfer paper 3 transported to the pair of register rollers 21 is fed to the transfer drum 20 at predetermined intervals. Successively, the transfer paper 3 is pressed against the transfer drum 20 by a transfer roller, not shown, and be wound around the surface of the transfer drum 20 by electrostatic absorption due to electric charges induced on the surface of the transfer drum 20 so as to be held. Then, the transfer paper 3 is pressed against by the photoreceptor drum 10.

Next, the black toner image is transferred onto the transfer paper 3 which is pressed against the photoreceptor drum 10 by utilizing a potential difference between an electric charge of the black toner image and an electric charge on the surface of the transfer paper 3. At this time, part of the toner which does not contribute to transfer remains on the surface of the photoreceptor drum 10, but the remained toner is scraped off by the cleaning unit 18. Furthermore, a charge eliminating lamp (not shown) eliminates remained electric charges from the surface of the photoreceptor drum 10.

After completion of the above process, the vertical synchronous idle is outputted from the printer controller 4 to the image processor 5. When receiving the vertical synchronous idle, the image processor 5 starts a next printing operation.

Successively, the charger 11 uniformly charges the surface of the photoreceptor drum 10, and second image data transmitted from the printer controller 4 are outputted as a laser beam of yellow data. The laser beam of yellow data exposes the photoreceptor drum 10 and an electrostatic latent image for yellow is formed. Next, yellow toner is supplied from the yellow developer vessel 13 so that a yellow toner image is formed. Then, the toner image is transferred onto the transfer paper 3 so as to be superimposed on the former image.

Thereafter, when the cleaning device 18 and the charge eliminating lamp carry out the processes same as above mentioned, the charger 11 uniformly charges the photoreceptor drum 10, and third image data are transmitted from the printer controller 4. A laser beam of magenta data exposes the photoreceptor drum 10 and an electrostatic latent image for magenta is formed. Successively, magenta toner is supplied from the magenta developer vessel 14 to the photoreceptor drum 10 so that a magenta toner image is formed. Then, the toner image is transferred onto the transfer paper 3 so as to be superimposed on the former images.

In addition, when the cleaning device 18 and the charge eliminating lamp carry out the processes same as above mentioned, the charger 11 uniformly charges the photoreceptor drum 10, and fourth image data are transmitted from the printer controller 4. A laser beam of cyan data exposes the photoreceptor drum 10 and an electrostatic latent image for cyan is formed. Successively, cyan toner is supplied from the cyan developer vessel 15 to the photoreceptor drum 10 so that a cyan toner image is formed. Then, the toner image is transferred onto the transfer paper 3 so as to be finally superimposed on the former images.

Next, the transfer paper 3 on which the toner has been transferred is forcibly peeled from the transfer drum 20 by the peeling claw 31. The toner image is heated and is pressed on peeled transfer paper 3 by pressure in the fixing device 32. Thereafter, the transfer paper 3 is discharged onto the discharge tray 33 by the pair of discharge rollers, not shown. The color printing is completed by the above procedures of operation.

Meanwhile, the black-and-white printing is carried out by supplying black toner from the black developer vessel 16 to the electrostatic latent image of the photoreceptor drum 10 and by transferring the toner image onto the transfer paper 3. Here, in the above electrophotographic process, the operations of each section of the printer are controlled by the printer controller 4. Moreover, the order that the image processor 5 processes each image data is not limited to the above order of black, yellow, magenta and cyan.

As mentioned above, the printer of the present embodiment as an image forming apparatus is arranged so as to include the bit map data generating section 39 for generating binary dot data for each color from image data, the image memory 40 for storing the dot data, the edge dot discriminating section 43 and the look-up table 44 for discriminating edge dots positioned in an edge section, such as a curved line section, a slanted line section of characters, graphics, photo images, etc., in dot data for black stored in the image memory 40, and the dot modulating circuit 45 for modulating the dot data so that the edge dots and printing dots other than black ones become smaller than printing dots for black other than the edge dots.

Normally, in images to be printed, characters, etc. are mostly composed of printing dots of black, but on the contrary, graphics and photo images, etc., for example, are mostly composed of printing dots other than black ones. For this reason, even when a discrimination is not made as to whether image data are image data of characters, etc. or image data of graphics, photo images, etc., the edge dot discriminating section 43 discriminates edge dots in the dot data for black, and the dot modulating circuit 45 modulates the dot data in the above manner, thereby making it possible to eliminate jaggedness in the edge section of characters, graphics, etc. so as to have a smooth line. Moreover, since linear tone can be obtained even in the section where colors are deep by modulating the dot data by the dot modulating circuit 45, excellent tone can be obtained, for example, in multi-color printing, such as full-color printing.

This makes it possible to improve reproducibility of tone of binarized image data and also to eliminate jaggedness in the edge section of characters, graphics, etc. so as to have a smooth line. Moreover, since a complicated discriminating circuit, a controlling method, etc. for discriminating between image data of characters, etc. and image data of graphics, photo images, etc. are not required, it is possible to provide a printer at a low price.

Here, in the above embodiment, a laser printer is illustrated as an image forming apparatus, but the image forming apparatus of the present invention is not limited to a laser printer. The image forming apparatus of the present invention may be a digital printer, a facsimile, a scanner printer, a copying machine, etc., for example.

In the case where the image forming apparatus is a scanner printer and a copying machine, the optical unit includes the semiconductor laser optical system as well as a scanner laser optical system. The scanner laser optical system includes a lamp unit, a mirror, a lens unit, a CCD (Charge Coupled Device) sensor, etc. In this case, the scanner laser optical system irradiates a document placed on a document platen using the lamp unit, and an obtained reflected light is led through the mirror and the lens unit to a light-receiving surface of the CCD sensor so as to be taken in as an electric signal. After a video signal of the document taken in as an electric signal undergoes the prescribed process in an image processor, it is transmitted to the semiconductor laser optical system. Here, the subsequent operations are performed in the same manner as the operations of the laser printer in the above embodiment.

The following will discuss another embodiment of the present invention referring to FIG. 7 and FIG. 15 through FIG. 17. Here, for convenience of explanation, those members that have the same arrangement and functions, and that are described in the aforementioned embodiment are indicated by the same reference numerals and the description thereof is omitted.

Figure 15:
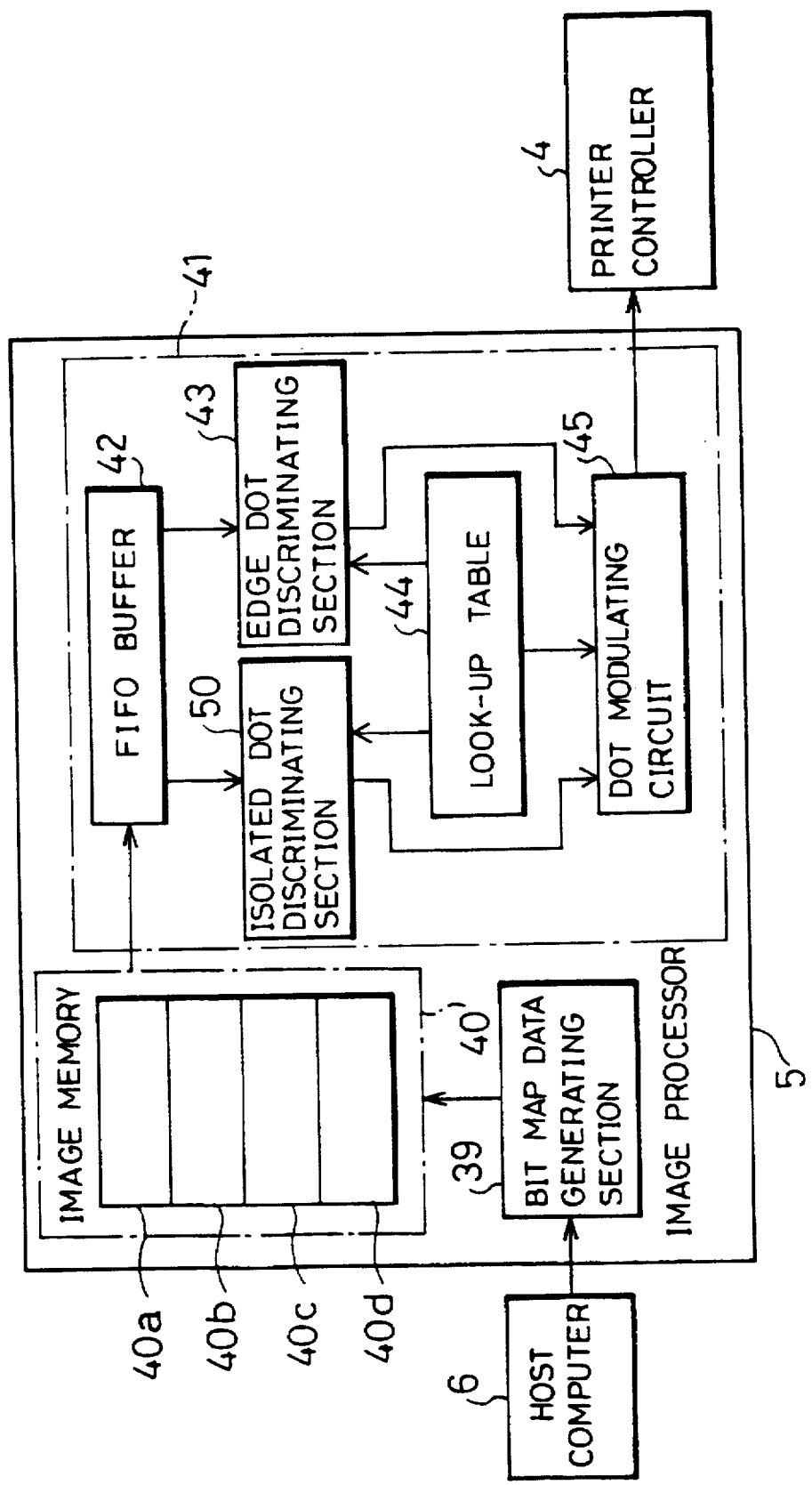
FIG. 15 is a block diagram which shows an arrangement of a main section of a printer as an image forming apparatus in another embodiment of the present invention.

As shown in FIG. 15, the printer of the present embodiment as an image forming apparatus further includes an isolated dot discriminating section 50 in an image processing section 41 of an image processor 5. The isolated dot discriminating section (isolated dot discriminating means, solid dot discriminating means) 50 discriminates isolated dots and solid dots in dot data which are image data transmitted from an FIFO buffer 42 as mentioned above. A look-up table (isolated dot discriminating means, solid dot discriminating means) 44 further stores dot patterns which are used when the discriminating process is carried out.

Figure 16A:
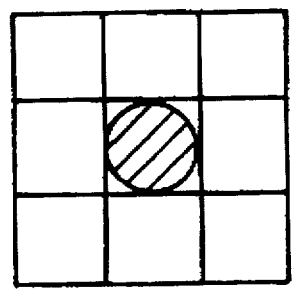
FIG. 16(a) is an explanatory drawing which shows one example of a dot pattern which is used when isolated dots are discriminated in an isolated dot discriminating section of the printer in FIG. 15.
Figure 16B:
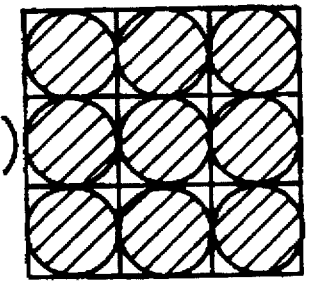
FIG. 16(b) is an explanatory drawing which shows one example of a dot pattern which is used when isolated dots are discriminated in the isolated dots discriminating section.

FIG. 16 shows one example of a plurality of dot patterns stored in the look-up table 44. A dot pattern in FIG. 16(a) shows a dot pattern of an isolated dot. In other words, the isolated dot means a printing dot in which there exist no printing dots for same color in the circumference of the isolated dot, namely, shows a printing dot whose circumference is surrounded by non-printing dots. Moreover, a dot pattern in FIG. 16(b) shows a dot pattern of solid dots. In other words, the solid dots mean printing dots whose circumference is surrounded by printing dots with a same color.

The isolated dot discriminating section 50 discriminates isolated dots and solid dots in dot data which are image data other than those for black, namely, each image data for yellow, magenta and cyan. The isolated dot discriminating section 50 compares a dot pattern composed of a matrix of 3×3 centering on the focused dot D to be discriminated with the dot pattern stored in the look-up table 44. Then, when the dot pattern including the focused dot D is equal to the stored dot pattern, the isolated dot discriminating section 50 discriminates that the focused dot D as an isolated dot or a solid dot. Furthermore, the isolated dot discriminating section 50 performs the discriminating process on all the dot data, namely all the printing dots.

In addition, the isolated dot discriminating section 50 does not perform the discriminating process for discriminating an isolated dot and a solid dot on the image data for black. Therefore, the isolated dot discriminating section 50 performs the discriminating process only on each image data for yellow, magenta and cyan, and transmits the image data to the dot modulating circuit 45. Here, the isolated dot discriminating section 50 does not transmit the image data for black which do not undergo the the discriminating process to the dot modulating circuit 45.

Meanwhile, an edge dot discriminating section 43 performs the discriminating process which has been mentioned in the embodiment 1 in detail only on the image data for black, and transmits the image data to the dot modulating circuit 45. Here, the edge dot discriminating section 43 does not transmit each image data for yellow, magenta and cyan which do not undergo the discriminating process to the dot modulating circuit 45.

The dot modulating circuit 45 reads out a pulse pattern, which corresponds to an isolated dot and a solid dot, and a pulse pattern, which corresponds to printing dots other than the both, from the look-up table 44 based upon the result of the discriminating process in the isolated dot discriminating section 50. The dot modulating circuit 45 replaces the pulse pattern corresponding to each dot with the read-out pulse pattern. Then, the dot modulating circuit 45 transmits the dot data modulated by the replacement to a printer controller 4.

Namely, the dot modulating circuit 45 outputs a video signal to the printer controller 4.

FIG. 7(a) shows the case where an isolated dot which agrees with the dot pattern shown in FIG. 16(a) and a solid dot which agrees with the dot pattern shown in FIG. 16(b) are modulated. In this case, the modulated isolated dot and the solid dot become printing dots having a normal size and shape. FIG. 7(d) shows the case where printing dots which do not agree with the dot patterns shown in FIGS. 16(a) and 16(b), namely, printing dots other than the isolated dot and the solid dot are modulated. In this case, the modulated printing dots become centered printing dots.

The image processor 5 obtains excellent half tone in printing of graphics, photo images, etc. by changing a size and a shape of dot data which are each image data for yellow, magenta and cyan and prevents occurrence of blank, etc. in a section where the printing dots close up (so-called solid section). The other arrangement of the printer is same as that of the printer in the aforementioned embodiment 1.

Figure 17:
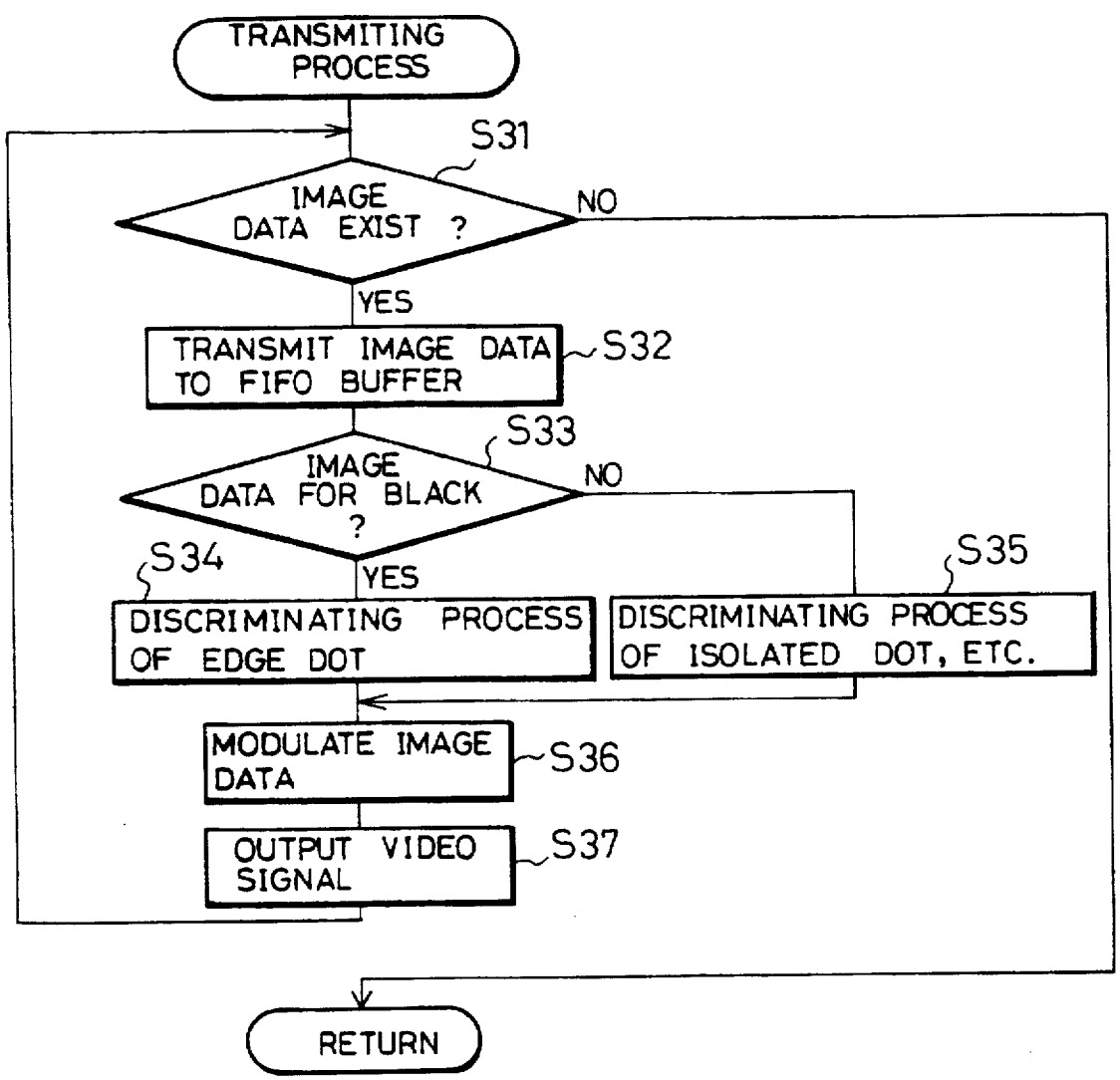
FIG. 17 is one part of a flow chart which shows a procedure for processing image data which is carried out in the image processor of the printer in FIG. 15.
Figure 18:
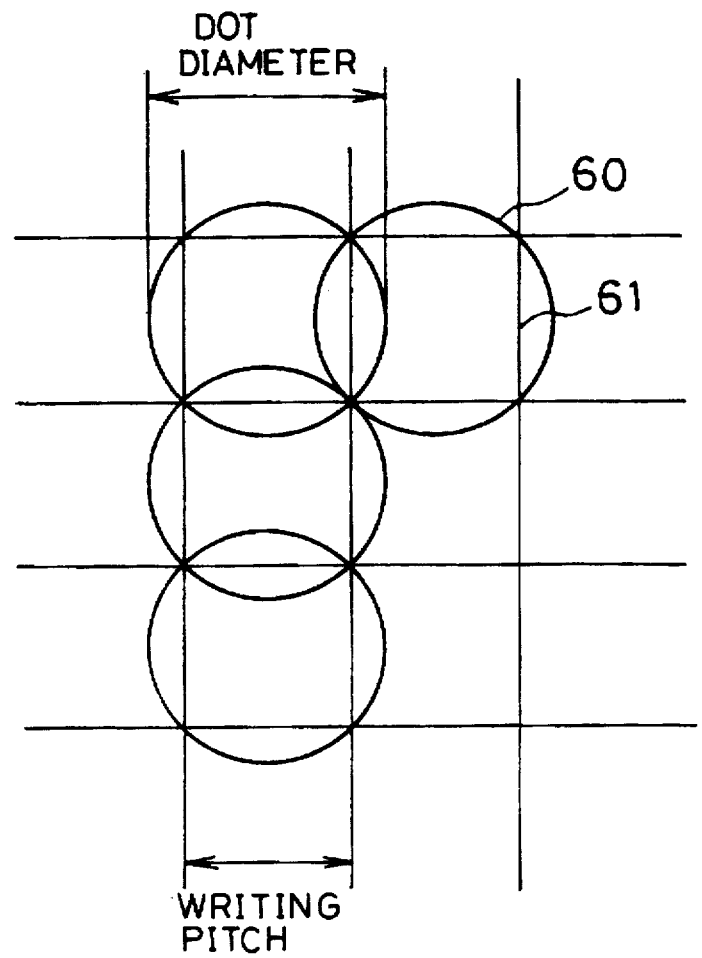
FIG. 18 is an explanatory drawing which shows a relationship between a dot diameter of printing dots and a width of a writing pitch in a conventional printer.
Figure 19:
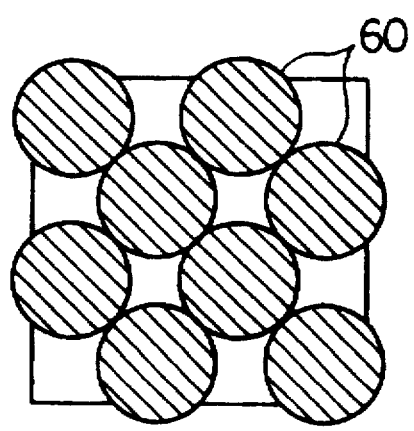
FIG. 19 is an explanatory drawing which shows one example of printing dots after modulation in a conventional printer.

The following will discuss an operation of image data processing by the image processor 5 with the above arrangement referring to a flow chart shown in FIG. 17. The image processor 5 of the present embodiment performs the following transmitting process instead of the transmitting process of S6 which has been mentioned in detail in the aforementioned embodiment 1.

First, the image processor 5 judges whether image data to be processed exist in prescribed memories 40a through 40d in an image memory 40 (S31). When the image data exist in the memories 40a through 40d, the image processor 5 transmits the image data stored in the memories 40a through 40d to the FIFO buffer 42 (S32). Here, when the image data do not exist in the memories 40a through 40d at S31, the image processor 5 returns.

Next, the image processor 5 transmits the image data from the FIFO buffer 42 to the edge dot discriminating section 43 and the isolated dot discriminating section 50. The edge dot discriminating section 43 and the isolated dot discriminating section 50 judge whether the image data are image data for black based upon a value set in a data flag (S33). When the image data are image data for black, the edge dot discriminating section 43 discriminates edge dots in dot data which are image data (S34). After completion of the discriminating process, the edge dot discriminating section 43 transmits the image data to the dot modulating circuit 45. Here, since the image data are image data for black, the isolated dot discriminating section 50 does not perform the discriminating process.

Meanwhile, when the image data are not image data for black at S33, namely, they are image data for yellow, magenta and cyan, the isolated dot discriminating section 50 discriminates an isolated dot and a solid dot in dot data which are image data (S35). After completion of the discriminating process, the isolated dot discriminating section 50 transmits the image data to the dot modulating circuit 45. Here, since the image data are image data for yellow, magenta and cyan, the edge dot discriminating section 43 does not perform the discriminating process.

Successively, the dot modulating circuit 45 modulates the image data (dot data) transmitted from the edge dot discriminating section 43 or the isolated dot discriminating section 50 (S36) as mentioned above. Then, the dot modulating circuit 45 transmits the modulated image data to the printer controller 4. Namely, the dot modulating circuit 45 outputs a video signal to the printer controller 4 (S37).

The image processor 5 repeats the steps S31 through S37 for a number of printing dots of dot data which are image data. Thereafter, when image data to be processed do not exist in the memories 40a through 40d (S31), the image processor 5 ends the transmitting process and returns.

As mentioned above, the image processing apparatus of the present embodiment is arranged so as to further include the isolated dot discriminating section 50 for discriminating isolated dot around which printing dots with same color as the isolated dots do not exist and solid dots whose circumference is surrounded by printing dots with same color as the solid dots in dot data other than black ones stored in the image memory 40 and that the dot modulating circuit 45 modulates dot data other than black ones so that the isolated dot and the solid dots become larger than the printing dots other than the isolated dots and the solid dots.

This makes it possible to obtain a clear and desired tone in a section with a light color. Moreover, in a so-called solid section, occurrence of blank is prevented. Meanwhile, since a linear tone can be obtained in a section with a deep color, excellent tone can be obtained in multi-color printing, such as full-color printing.

Here, in the above embodiment, the isolated dot discriminating section 50 in the image processor 5 is arranged so as to discriminated isolated dots and solid dots, but the isolated dot discriminating section 50 is not limited to the above arrangement. For example, the isolated dot discriminating section 50 in the image processor 5 may be arranged so as to discriminate only isolated dots and may be arranged so as to discriminate only solid dots.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus for printing an image to be printed by forming black printing dots and printing dots with a plurality or primary colors, comprising:

dot data generating means for generating binary data of the black dots and binary data of the dots with primary colors for each color from image data;

storing means for storing the black dot data and the dot data with primary colors;

black edge dot discriminating means for discriminating between black edge dots positioned in an outline section of an image to be printed and black non-edge dots, which are not positioned in the outline section of the image, in the black dot data stored in said storing means;

dot data modulating means for modulating the black dot data so that the black edge dots become smaller than the black non-edge dots and modulating the dot data with primary colors so that the dots with primary colors become smaller than the black non-edge dots.

2. The image forming apparatus as defined in claim 1, further comprising:

primary-colored isolated dot discriminating means for discriminating isolated dots with primary colors, around which printing dots with a same color as the isolated dots with primary colors do not exist, in the dot data With primary colors stored in said storing means, wherein said dot data modulating means modulates the dot data with primary colors so that the isolated dots with primary colors become larger than the dots with primary colors other than the isolated dots with primary colors.

3. The image forming apparatus as defined in claim 1, further comprising:

primary-colored solid dot discriminating means for discriminating solid dots with primary colors, whose circumference is surrounded by printing dots with a same color the solid dots with primary colors, in the dot data with primary colors stored in said storing means, wherein said dot data modulating means modulates data with primary colors so that the solid dots with primary colors become larger than dots with primary colors other than the solid dots with primary colors.

4. The image forming apparatus as defined in claim 2, further comprising:

primary-colored solid dot discriminating means for discriminating solid dots with primary colors, whose circumference is surrounded by printing dots with a same color as the solid dots with primary colors, in the dot data with primary colors stored in said storing means, wherein said dot data modulating means modulates the dot data with primary colors so that the solid dots with primary colors become larger than dots with primary colors other than the solid dots with primary colors.

5. The image forming apparatus as defined in claim 1, wherein said edge dot discriminating means is composed of:

a memory for storing plural types of dot patterns which represent an edge; and an edge dot discriminating section for discriminating whether the dot data are edge dots by comparing the dot data read out from said storing means with the dot pattern read out from said memory and discriminating a type of the edge dots.

6. The image forming apparatus as defined in claim 5, wherein:

said memory further stores plural types of dots having a different size and a different shape according to a type of the edge dots; and said modulating means reads out dots of a type which corresponds to a type of the edge dots from said memory and outputs the dots instead of the edge dots.

7. The image forming apparatus as defined in claim 6, is a laser printer which forms a color image using black dots, yellow dots, magenta dots and cyan dots.

* * * * *